US007172709B2

(12) United States Patent
Clark

(10) Patent No.: US 7,172,709 B2
(45) Date of Patent: Feb. 6, 2007

(54) USE OF FLUORINE-FREE FIRE FIGHTING AGENTS

(75) Inventor: Kirtland P. Clark, Mansfield, TX (US)

(73) Assignee: Chemguard, Inc., Mansfield, TX (US)

( * ) Notice: Subject to any disclaimer, the term of this patent is extended or adjusted under 35 U.S.C. 154(b) by 0 days.

(21) Appl. No.: 11/305,554

(22) Filed: Dec. 16, 2005

(65) Prior Publication Data

US 2006/0091350 A1 May 4, 2006

Related U.S. Application Data

(62) Division of application No. 10/600,810, filed on Jun. 20, 2003, now Pat. No. 7,005,082.

(51) Int. Cl.
*A62D 1/02* (2006.01)
*A62D 1/04* (2006.01)
*C09K 21/08* (2006.01)
*C09K 21/14* (2006.01)

(52) U.S. Cl. ................... 252/3; 252/2; 252/8; 252/601; 252/610; 252/611; 252/6.5; 169/44; 169/45; 169/46

(58) Field of Classification Search ..................... None
See application file for complete search history.

(56) References Cited

U.S. PATENT DOCUMENTS 3,422,011 A 1/1969 Jackovitz et al.
3,457,172 A 7/1969 Stewart et al.
3,562,156 A 2/1971 Francen
3,579,446 A 5/1971 Kroke et al.
3,957,657 A 5/1976 Chiesa, Jr.
4,060,132 A 11/1977 Chiesa, Jr.
4,060,489 A 11/1977 Chiesa, Jr.
4,284,517 A 8/1981 Chen et al.
4,303,534 A 12/1981 Hisamoto et al.
4,306,979 A 12/1981 Tsuji
4,317,893 A 3/1982 Chen et al.
4,387,032 A 6/1983 Chiesa, Jr.
4,420,434 A 12/1983 Falk
4,424,133 A 1/1984 Mulligan
4,464,267 A 8/1984 Chiesa, Jr. et al.
4,472,286 A 9/1984 Falk
4,474,916 A 10/1984 Streit et al.
4,500,684 A 2/1985 Tucker
4,683,066 A 7/1987 Rose et al.
4,908,155 A 3/1990 Leemans et al.
4,999,119 A 3/1991 Norman et al.
5,039,433 A 8/1991 Sopko et al.
5,085,786 A 2/1992 Alm et al.
5,207,932 A 5/1993 Norman et al.
5,218,021 A 6/1993 Clark et al.
5,616,273 A 4/1997 Clark et al.
5,750,043 A 5/1998 Clark
6,090,894 A 7/2000 Schimmel et al.
6,156,222 A 12/2000 Jennings et al.
6,284,855 B1 9/2001 Schimmel et al.
6,361,768 B1 3/2002 Galleguillos et al.
6,528,575 B1 3/2003 Schade et al.

FOREIGN PATENT DOCUMENTS

DE 19710108 10/1997
EP 0765676 A1 4/1997
GB 2311219 9/1997

OTHER PUBLICATIONS

Synduyra Fluorine Free Foam Product Information Sheet, pp. 1-2, No Date, Angus Fire, (2002).
Angus Fire Presentation Slides from CACFOA Conference "Fire Fighting Foam & The Environment", presented Aug. 12, 2002, pp. 1-18, Reebok Stadium, Greater Manchester, England.
Publication entitled: "Good Chemistry has never been so bad for fire!" found at www.chemguard.com/home/corporate/body_foam_story.html. Chemguard, Inc. (2001).

*Primary Examiner*—Joseph D. Anthony
(74) *Attorney, Agent, or Firm*—Grady K. Bergen; Griggs Bergen LLP

(57) ABSTRACT

A foam concentrate provides a fire-fighting composition when mixed with water so that the fire-fighting composition does not form a stable seal on cyclohexane and meets UL 162, Class B performance criteria for at least one of AFFF agents and fluoroprotein (FP) agents without requiring organic fluorine. The concentrate is formed from water and a high molecular weight acidic polymer (HMWAP) and a coordinating salt.

25 Claims, No Drawings

USE OF FLUORINE-FREE FIRE FIGHTING AGENTS

This application is a division U.S. patent application Ser. No. 10/600,810, filed Jun. 20, 2003 now U.S. Pat. No. 7,005,082, entitled "Fluorine-Free Fire Fighting Agents and Methods."

TECHNICAL FIELD

The invention relates generally to fire-fighting agents.

BACKGROUND

Aqueous film forming foam (AFFF) agents are known for the rapid extinguishment of Class B fires and enhancement of safety by providing flashback or burnback resistance. First described by Francen in U.S. Pat. No. 3,562,156, AFFF agents by definition must have a positive spreading coefficient on cyclohexane. Many U.S. patents describe the composition of AFFF agents which meet the positive spreading coefficient criteria, such as U.S. Pat. Nos. 4,420,434; 4,472,286; 4,999,119; 5,085,786 and 5,218,021; 5,616,273.

The prior art relating to AFFF agents has one common element; the requirement of various quantities and types of fluorochemical surfactants to obtain the positive spreading coefficient when combined with various hydrocarbon surfactants. U.S. Pat. No. 5,616,273 describes present AFFF and alcohol resistant aqueous film forming (AR-AFFF) agents used to generate aqueous film forming foams having fluorine contents ranging from 0.020 to 0.044 percent in premix form. The actual fluorine level has been dependant on the required performance specifications, with higher fluorine content providing faster extinguishing performance and greater burn back resistance. The lowest fluorine content product (0.020% F) would contain about 1.3% by weight fluorochemical surfactant solids in the 3% liquid concentrate since these products contain about 50% by weight fluorine.

The criterion necessary to attain spontaneous spreading of two immiscible liquids has been taught by Harkins et al, *Journal Of American Chemistry,* 44, 2665 (1922). The measure of the tendency for spontaneous spreading of an aqueous solution over the surface of non-polar solvents such as hydrocarbons is defined by the spreading coefficient (SC) and can be expressed as follows:

$$SC_{a/b}=\gamma_a-\gamma_b-\gamma_c, \text{ where} \qquad 1)$$

$SC_{a/b}$=Spreading Coefficient;

$\gamma_a$=Surface tension of the lower hydrocarbon phase;

$\gamma_b$=Surface tension of the upper aqueous phase; and $\gamma_c$=Interfacial tension between the aqueous upper phase and the lower hydrocarbon phase.

If the SC is positive, in theory an aqueous solution should spread and film formation on top of the hydrocarbon surface should occur. The more positive the SC, the greater the spreading tendency will be. In practice, however, it has been found that no visible film seal occurs on cyclohexane until the SC is greater than about +3.5 to about +4.0, especially if the fluorochemical content is low. It is further known from the art that $\gamma_a$ is reduced as the temperature of the hydrocarbon is increased, as occurs during the burning of these fuels. This will lower the effective SC during fire extinguishing unless the fire extinguishing solution also has decreasing $\gamma_b$ on increasing temperature.

Fluorochemical surfactants have recently come under scrutiny by the EPA and environmental groups. In fact, at least one major manufacturer recently agreed to stop the manufacture of Perfluorooctanesulfonate (PFOS) and Perfluorooctanoic acid (PFOA) based products including fluorinated surfactants used in AFFF and AR-AFFF agents. The EPA, prior to May 2000, had determined that PFOS posed a long-term threat to the environment after PFOS was found in all animals tested and was determined to be toxic after various long-term feeding studies. The EPA has since initiated a program requiring other perfluorochemical producers to supply information on their products to the EPA. This would allow the EPA to evaluate potential environmental problems from other fluorochemical surfactants already in the marketplace.

It may therefore be desirable to have fire extinguishing products which do not contain fluorine-containing compounds, while still extinguishing Class B fires as effectively as AFFF agents.

The instant invention provides compositions that require little or no use of fluorochemical surfactants or other fluorine containing compounds, yet the novel fire fighting liquid concentrates still meet or exceed Fluoroprotein (FP) and Aqueous Film Forming Foam agent (AFFF) performance criteria on Class B, UL162 fires. If fluorochemical surfactant use is severely curtailed by the EPA, these agents could be important for the future of firefighting in the United States.

The commercial AFFF agent market in the United States consists most importantly of products which are UL listed such that consumers can be assured of minimum performance characteristics of AFFF agents. The UL 162 Standard for Safety covers Foam Equipment and Liquid Concentrates. Section 3.16, UL162 (Seventh edition, 1997) defines six liquid concentrates recognized by UL as low expansion liquid concentrates. Part a) defines Aqueous Film Forming (AFFF) as "a liquid concentrate that has a fluorinated surfactant base plus stabilizing additives." Part b) defines Protein as "a liquid concentrate that has a hydrolyzed protein plus stabilizing additives." Part c) defines Fluoroprotein (FP) as "a liquid concentrate that is similar to protein, but with one or more fluorinated surfactant additives." Part d) defines Film Forming Fluoroprotein (FFFP) as "a liquid concentrate that has both a hydrolyzed protein and fluorinated surfactant base plus stabilizing additives." Part e) defines Synthetic as "a liquid concentrate that has a base other than fluorinated surfactant or hydrolyzed protein. Finally Part f) defines Alcohol Resistant as "a liquid concentrate intended to extinguish both hydrocarbon and polar (water miscible) fuel fires."

Fire test foam application and duration to burnback ignition is given in UL162 Table 10.1 for Class B fire tests. These minimum performance criteria must be met for liquid concentrates to be "UL listed" as Class B liquid concentrates. Of the six liquid concentrates defined by UL 162, only protein and synthetic do not contain fluorosurfactant and, of these, only protein has UL listed 3% products for use on Class B liquid fires. At this time, synthetic liquid concentrates are mainly UL listed as wetting agents and defined by UL as "liquid concentrates which, when added to plain water in proper quantities, materially reduce the surface tension of plain water and increases its penetration and spreading ability . . . . Listed wetting agents solutions or foams improve the efficiency of water in extinguishing fires."

Only one synthetic, SYNDURA, commercialized by Angus Fire Armour is UL listed on Class B fires at 6% dilution rate and at the fluoroprotein application rate. Syndura utilizes a polysaccharide stabilizing agent, and although marketed as "operationally fluorine-free," it does contain at least some fluorine.

DETAILED DESCRIPTION

The present invention provides fire fighting concentrates of the synthetic type which meet and exceed UL listing requirements for use on Class B fires as listed in UL162 that may have "zero" fluorine content. Further, these products may be used at 3% concentrate level. No fluorosurfactants or fluorinated polymers are required to meet the UL162 standard but may be used to improve extinguishing speed and burnback times, if desired. The compositions for use as fire extinguishing concentrates can meet or exceed Fluoroprotein (FP) and AFFF performance criteria on Class B, UL162 non-polar (water insoluble) liquid fires, but without the need of fluorochemical surfactants or polymers, as required in the prior art. These compositions include synthetic liquid concentrates stabilized with high molecular weight acidic polymers (HMWAP) and coordinating salt(s), which extinguish non-polar Class B fires. No fluorosurfactants or fluorinated polymers are required to meet the UL162 standard, but may be used to improve extinguishment speed and burnback times, if desired. Thus, as used herein, the expression "without requiring fluorine" or "without requiring organic fluorine" is meant to cover those situations wherein the composition provides the stated performance absent such fluorine or organic fluorine components that might otherwise be included, with all other components and relative quantities of such components (other than the specified fluorine) remaining the same, and does not preclude that fluorine or organic fluorine may be included in such compositions.

The invention further provides a method of extinguishing Class B non-polar liquid fires using the fire fighting compositions without requiring or having no added fluorochemical surfactants or fluorinated polymers, or with very low fluorochemical surfactants or fluorinated polymer content. This method provides fast extinguishment and burnback similar to that provided by FP agents, as well as, AFFF agents having high fluorochemical surfactant content. And although Class B liquid fire performance (UL162) for such agents is achieved without requiring fluorine-containing compounds, fluorine-containing compounds may still be used, if desired.

It has been found that synthetic liquid concentrate can be stabilized to Class B liquid fire performance (UL162) with the addition of various foam stabilizing acidic polymeric additives in conjunction with coordinating salts. The effectual HMWAP additive and the effective level necessary for improving the synthetic liquid concentrate can be readily identified and determined through a straightforward laboratory test. Salts of interest would include those of Aluminum, Antimony, Barium, Boron, Calcium, Copper, Iron, Magnesium, Strontium, Thallium, Tin, Titanium, and Zinc. Salts having oxidation states of +2 and +3 are most useful; and include salts of Aluminum, Boron, Calcium, Iron, Magnesium and Zinc.

HMWAPs may include those containing multiple carboxylic acid groups or other functionally acidic groups, such as sulfonic and phosphoric groups. Such polymers include but are not limited to polymers or copolymers prepared by the polymerizing of monomers, which may have one or more acidic functional groups thereon, and that provide hydrophobic groups, which may be in the form of alkyl branches or tails along the polymer chain of from C4 to C22 or greater. As used herein, "polymer" refers to homopolymers or copolymers, and the term "copolymer" refers to those polymers prepared from the polymerization of two or more dissimilar monomers. The HMWAP may also be prepared from linear or non-linear polymers wherein alkyl branching or tails are provided after polymerization of the main polymer chain. The acidic functional groups may also be provided after formation of the branched polymer chain. The various methods of preparation of such HMWAP are well known to those skilled in the art.

As stated, the HMWAP have alkyl branches or tails of from C4 to C22 or greater, some or all of which may contain acidic functional groups. The polymers, however, may contain alkyl groups with chains of C4 to C 18 length, more particularly, polymers containing multiple alkyl groups with chains of C8 to C16 length. The HMWAP may have an average molecular weight of from about 5000 to about 2,000,000 or greater. In certain embodiments, the HMWAP may have an average molecular of from about 20,000 or 30,000 to about 1,000,000.

Effective in stabilizing the synthetic liquid concentrate foam bubble to Class B liquids are HMWAPs containing hydrophobic groups, more particularly C8 to C16 alkyl substituents including commercial products, such as Chemguard HS-100, available from Chemguard, Inc. Mansfield, Tex. Chemguard has used HS-100 since 1999 in combination with Chemguard FS-100 (fluorinated surfactant) to make especially efficient AFFF agents. Chemguard HS-100 is an HMWAP surfactant of unknown exact structure which increases foam expansion, drain time, and fluidity in the AFFF formulation. In 3% AFFF agents, HS-100 is used at less than about 0.7% actives in all formulations to obtain optimal performance and formulations typically contain only 1–2% hydrated magnesium sulfate.

When Chemguard HS-100 (HMWAP), which may be used at 2–4% actives, and hydrated magnesium sulfate, which may be used at approximately 5–30%, is used in 3% synthetic liquid concentrates, excellent Class B, UL162 fire performance is obtained without the addition of fluorochemical surfactants or fluorine containing compounds. Unless otherwise specified all percentages presented herein are by weight. When HS-100 is used at the lower level, greater quantities of magnesium sulfate may be required, while lower levels of magnesium sulfate are effective when higher levels of HS-100 are used. If desired, higher levels of Chemguard HS-100 and magnesium sulfate may be used to provide even stronger performance and weaker but still well performing products can be made using lower quantities of these products.

The composition may be used for providing training foams. An example of a training foam product includes 0.9% actives Chemguard HS-100 and about 10% magnesium sulfate, which may be used as 3% training foams. Similarly, 1% training foams without environmental problems, except possibly for foam, can be prepared with about 2.7% actives Chemguard HS-100 and 30% magnesium sulfate.

The present invention has application to fire extinguishing compositions useful for extinguishing UL162 Class B non-polar (water insoluble) liquid fires by the addition of effectual HMWAP and coordinating salts to various synthetic liquid concentrates at effective levels. The composition of HMWAP and polyvalent salts as here defined could also be used in low protein content products (i.e. less than 10% protein by weight).

The instant invention further provides a method of extinguishing Class B fires using the fire fighting compositions having no added fluorochemical surfactant or other compounds containing fluorine. This method provides fast extinguishment and burn back similar to that provided by FP agents, as well as, AFFF agents having high fluorochemical surfactant or other fluorine content. The concentrates may be educted at 6% or 3% into water, either fresh, brackish, or sea water, and applied to the fire from aspirated or non-aspirated devices, foam chambers, or sprinkler systems. As used herein, the term "water" may include pure, deionized or distilled water, tap or fresh water, sea water, brine, or an aqueous or water-containing solution or mixture capable of serving as a water component for the fire fighting composition.

AFFF and FP agents are known as excellent foams for extinguishing non-polar Class B fires; however, the presence of fluorosurfactants is seen by many as a potential environmental hazard. The present invention provides a means of extinguishing these difficult fires without the use of either fluorosurfactants or other fluorine containing compounds and therefore does not pose an environmental hazard, other than foam.

The use of HMWAP and coordinating salts is advantageous, in part, due to the well established lower toxicity of polymers relative to monomeric compounds. In fact, it is much easier to list polymers (none reactive) on the TSCA inventory than low molecular weight materials due to this fact. Similarly, in Europe, polymers are exempt from the EINICS list. It is widely understood that as polymers increase in MW, their absorption rate through skin decreases. Further, high MW polymers rapidly adsorb to solid surfaces such as dirt, rocks, etc, and are much less available for entering water ways. Therefore, they are in general more environmentally benign than low MW surfactants and chemicals.

The present invention is readily extended to provide fire extinguishing agents having exceptional performance if small amounts of fluorosurfactants or high molecular weight fluorinated polymers (HMWFPs), as described in U.S. patent application Ser. No.10/213,703 for Fire Extinguishing or Retarding Material are included in these formulations, and which is herein incorporated by reference.

The claimed synthetic surfactant liquid compositions may be produced at many strengths, including but not limited to 3 and 6% foam concentrates. The lowest numbered strength is actually the most concentrated product. Therefore, three parts of 3% and 97 parts water gives 100 parts of use strength pre-mix, whereas, six parts 6% and 94 parts water gives 100 parts of pre-mix.

For the sake of simplicity only 3% products will be exemplified here, while it is understood that many other strength products are included. A general composition for a 3% liquid concentrate (used at 3 parts concentrate to 97 parts fresh or tap water) is as follows:

| Component | | % by weight (100%) |
|---|---|---|
| A | High molecular weight acidic polymer (HMWAP) | 0.9–6 |
| B | Coordinating salt | 4–40 |
| C | Amphoteric Hydrocarbon Surfactant | 0–3 |
| D | Anionic Hydrocarbon Surfactant | 2–12 |
| E | Nonionic Hydrocarbon surfactant | 0–5 |
| F | Fluorochemical Surfactant | 0–0.4 |
| G | Foam aids including glycol ethers | 0–15 |
| H | Freeze protection package | 0–45 |
| I | Sequestering, buffer, corrosion package | 0–5 |
| J | Polymeric film formers | 0–2 |
| K | Biocides, antimicrobial | 0–0.1 |
| L | Polymeric foam stabilizers and thickeners | 0–10 |
| M | Water | Balance |

The above components would be reduced accordingly relative to the 3% liquid concentrate to prepare 6% synthetic liquid foam concentrates.

Most Class A foam concentrates fit within the definition of the base surfactant defined above. Therefore, addition of an effectual HMWAP and coordinating salt (as defined from the laboratory test) has application to many Class A foam concentrates as well.

Similarly, an effectual HMWAP and coordinating salt may also be added to 3 or 6% liquid protein concentrate containing no or trace fluorochemical surfactant The HMWAP (Component A) and polyvalent coordinating salt (Component B) are chosen using the laboratory test described in the experimental section. In general these are products prepared from monomers, either mono—or polyfunctional, polymerized with reactive polyfunctional monomers, prepolymers or high MW polymers with appropriate reactive sites. Hydrophobic and acidic sites may be formed within the polymer by inclusion with the monomers or by addition to the formed polymer, such as reaction of sodium monochloroacetate with amine residues. Examples of polymers for consideration using the defined performance test are described in U.S. Pat. Nos. 6,528,575 B1; 6,361,768 B1; 6,284,855 B1; 6,090,894; 5,039,433, 4,683,066; 4,474,916; 4,500,684; 4,908,155; 4,317,893; 4,284,517, which are herein incorporated by reference.

A suitable commercially available HMWAP (Component A) is Chemguard HS-100, a high MW acidic polymer having multiple C12 alkyl tails and multiple carboxylic acid groups.

Component B include electrolytes and coordinating salts, added to coordinate with the above Component A HMWAPs to stabilize the foam bubble to fire and hot solvents. Typical electrolytes and salts may include those of Aluminum, Antimony, Barium, Boron, Calcium, Copper, Iron, Magnesium, Strontium, Thallium, Tin, Titanium, and Zinc. Salts having oxidation states of +2 and +3 are suitable. Included are the alkaline earth metals, especially magnesium, calcium, strontium, and zinc or aluminum. The cations of the electrolyte are not critical, except that halides may be undesirable from the standpoint of metal corrosion. Sulfates, bisulfates, phosphates, nitrates and the like are also acceptable. As used herein, the expression "coordinating salt" is meant to include both salts and electrolytes.

Particularly useful are polyvalent salts such as magnesium sulfate and magnesium nitrate.

The amphoteric hydrocarbon surfactants (Component C) include but are not limited to those which contain in the same molecule, amino and carboxy, sulfonic, sulfuric ester and the like. Higher alkyl (C6–C14) betaines and sulfobetaines are included. Examples of commercially available products include Chembetaine CAS and Mirataine CS, both sulfobetaines, MacKam 2CYSF and Deriphat 160C, a C12 amino-dicarboxylate. These products are excellent foaming agents and help reduce interfacial tension in water solution.

Anionic hydrocarbon surfactants (Component D) include but are not limited to alkyl carboxylates, sulfates, sulfonates, and their ethoxylated derivatives. Alkali metal and ammonium salts may also be used. Anionic hydrocarbon surfactants in the C8–C16, C8–C12, and C8–C10 range are particularly useful.

The nonionic hydrocarbon surfactants (Component E) help reduce interfacial tension and solubilize other components, especially in hard water or sea water solutions. In addition, they serve to control foam drainage, foam fluidity, and foam expansion. Suitable nonionic surfactants include but are limited to polyoxethylene derivatives of alkylphenols, linear or branched alcohols, fatty acids, alkylamines, alkylamides, and acetylenic glycols, alkyl glycosides and polyglycosides as described in U.S. Pat. No. 5,207,932 and others, and block polymers of polyoxyethylene and polyoxypropylene units.

Fluorochemical surfactants (Component F), which may be useful at low levels, are found in the many AFFF patents including but not limited to those described in U.S. Pat. Nos. 5,616,273, 5,218,021; 5,085,786; 4,999,119; 4,472,286; 4,420,434; 4,060,489, which are herein incorporated by reference.

Small quantities of fluorochemical surfactant may be added to increase extinguishing speed and burnback resistance. But in all instances, the total fluorochemical surfactant content is limited to less than one-half normal workable levels in the absence of the inventive matter to provide UL 162 Class B fire performance. This means less than about 0.20% fluorine as fluorochemical surfactant in a 3% concentrate or less than about 0.006% fluorine at the working strength. This compares very favorably with data of U.S. Pat. No. 5,207,932 leading to a commercial product with low end working fluorine content of 0.013% fluorine (a 55% reduction in fluorine content).

Foam aids (Component G) are used to enhance foam expansion and drain properties, while providing solubilization and anti-freeze action. Useful solvents are disclosed in U.S. Pat. Nos. 5,616,273, 3,457,172; 3,422,011 and 3,579,446, which are herein incorporated by reference.

Typical foam aids are alcohols or ethers such as: ethylene glycol monoalkyl ethers, diethylene glycol monoalkyl ethers, propylene glycol monoalkyl ethers, dipropylene glycol monoalkyl ethers, triethylene glycol monoalkyl ethers, 1-butoxyethoxy-2-propanol, glycerine, and hexylene glycol.

The freeze protection package (Component H) may include glycerine, ethylene glycol, diethylene glycol, and propylene glycol. Also included are salts and other solids which reduce freeze point such as calcium, potassium, sodium and ammonium chloride and urea.

Component I, the sequestering, buffer, and corrosion package, are sequestering and chelating agents exemplified by polyaminopolycarboxylic acids, ethylenediaminetetraacetic acid, citric acid, tartaric acid, nitrilotriacetic acid, hydroxyethylethylenediaminetriacetic acid and salts thereof.

Buffers are exemplified by Sorensen's phosphate or Mcllvaine's citrate buffers. Corrosion inhibitors are only limited by compatibility with other formula components. There may be exemplified by ortho-phenylphenol, toluyl triazole, and many phosphate ester acids.

Components J is a water soluble polymeric film former and may be used for the formulation of AR (alcohol resistant) agents which are used to fight both polar (water soluble) and non-polar solvent and fuel fires. These polymeric film formers, dissolved in AR agents, precipitate from solution when the bubbles contact polar solvents and fuel, and form a vapor repelling polymer film at the solvent/foam interface, preventing further foam collapse. Examples of suitable compounds include thixotropic polysaccharide gums as described in U.S. Pat. Nos. 3,957,657; 4,060,132; 4,060,489; 4,306,979; 4,387,032; 4,420,434; 4,424,133; 4,464,267, 5,218,021, and 5,750,043, which are herein incorporated by reference. Suitable commercially available compounds are marketed as Rhodopol, Kelco, Keltrol, Actigum, Cecal-gum, Calaxy, and Kalzan.

Gums and resins useful as Component J include acidic gums such as xanthan gum, pectic acid, alginic acid, agar, carrageenan gum, rhamsam gum, welan gum, mannan gum, locust bean gum, galactomannan gum, pectin, starch, bacterial alginic acid, succinoglucan, gum arabic, carboxymethylcellulose, heparin, phosphoric acid polysaccharide gums, dextran sulfate, dermantan sulfate, fucan sulfate, gum karaya, gum tragacanth and sulfated locust bean gum.

Neutral polysaccharides useful as Components J include: cellulose, hydroxyethyl cellulose, dextran and modified dextrans, neutral glucans, hydroxypropyl cellulose, as well, as other cellulose ethers and esters. Modified starches include starch esters, ethers, oxidized starches, and enzymatically digested starches.

Components K, antimicrobials and preservatives, may be used to prevent biological decomposition of natural product based polymers incorporated as Components J. Included are Kathon CG/ICP and Givgard G-4-40 manufactured by Rohm & Haas Company and Givaudan, Inc., respectively, as disclosed in U.S. Pat. No. 5,207,932. Additional preservatives are disclosed in the above polar agent patents—U.S. Pat. Nos. 3,957,657; 4,060,132; 4,060,489; 4,306,979; 4,387,032; 4,420,434; 4,424,133; 4,464,267, 5,218,021, and 5,750,043, which are herein incorporated by reference.

Components L are polymeric foam stabilizers and thickeners which can be optionally incorporated into AFFF and AR-AFFF agents to enhance the foam stability and foam drainage properties. Examples of polymeric stabilizers and thickeners are partially hydrolyzed protein, starches, polyvinyl resins such as polyvinyl alcohol, polyacrylamides, carboxyvinyl polymers, polypyrrolidine, and poly(oxyethylene) glycol.

Many commercial synthetic surfactant concentrates are marketed worldwide by Chemguard, Kidde, and Tyco. The addition of an effectual high MW acidic polymer and coordinating salt to these liquid concentrates at an effective concentration may be encompassed by the present invention. These products include: Class A foams (CLASS A PLUS and SILVEX), excellent for extinguishing forest fires, structural fires, and tire fires; High expansion foams sold under the names HI-EX, EXTRA, C2, and VEE-FOAM; Vapor suppressant foam sold by Chemguard as VRC foam; Bomb foam, a 6% product sold by Chemguard as AFC-380.

Synthetic surfactant concentrates listed as "wetting agents" by Underwriters Laboratory are also included as base surfactant mixtures for use in this invention. Products listed by UL as "wetting agents" include the following: Fire Strike by Biocenter Inc.; Bio-Fire by Envirorenu Technologies LLC; Enviro-Skin 1% by Environmental Products Inc.; F-500 by Hazard Control Technologies Inc.; Knockdown by National Foam Inc.; Phos-Chek WD881 by Solutia Inc.; Flameout by Summit Environmental Corp. Inc. MicroBlazeout by Verde Environmental Inc.; Bio-solve by Westford Chemical Corp.

EXAMPLES

In the examples below, references are made to specifications used by the industry to evaluate the efficiency of synthetic surfactant concentrates. More specifically, the examples refer to the following specifications and laboratory test methods:

Surface Tension and Interfacial Tension: According to ASTM D-1331-56. Based on laboratory tests, the surface tension of cyclohexane used for calculating the SC was 24.7 dynes/cm.

The UL 162 Type III, Class B, topside, fire test for AFFF agents was used to test the 3% synthetic liquid concentrates as premixes in tap water and synthetic sea water. For each fire test, 55 gallons of heptane was charged to a 50 $ft^2$ heavy steel UL pan with enough water in the bottom to give at least eight inches of sideboard. A US military type aspirating nozzle adjusted to give a 2.0 gallon per minute flow rate was placed on a stand. The fire is lit, allowed to burn for 60 seconds, and then foam is directed onto the surface of the fuel until the fire is about 75% extinguished. Then a firefighter picks up the nozzle and moves the foam stream back and forth until 90% extinguishment (control time) is obtained, at which time the firefighter is allowed to fight the fire from two sides of the pan. Times are recorded at 90% control and at extinguishment. Foam application is continued for a total of 3 minutes.

At about 8 minutes, a 1.0 square foot steel stovepipe is placed 1.0 ft from each side of the corner last extinguished and all foam inside the pipe is removed. After waiting 9 minutes from foam shut-off, the fuel inside the pipe is lit and allowed to burn for 1 minute. The pipe is then removed and timing of the burnback is started. When the fire increases to 20% of the pan area, the burnback time is recorded.

Foam quality is measured by taking the expansion ratio and drain time from the nozzle after running the fire test.

An AFFF product passes this fire test by extinguishing before 3 minutes and having a burnback equal to or greater than 5 minutes. Stronger products give shorter extinguishing and longer burnback times.

The UL 162 Type III, Class B, topside, fire test for Fluoroprotein (FP) agents was used to test the 3% synthetic liquid concentrates as premixes in tap water and synthetic sea water. For each fire test, 55 gallons of heptane was charged to a 50 $ft^2$ heavy steel UL pan with enough water in the bottom to give at least eight inches of sideboard. A US military type aspirating nozzle adjusted to give a 3.0 gallon per minute flow rate was placed on a stand. The fire is lit, allowed to burn for 60 seconds, and then foam is directed onto the surface of the fuel until the fire is about 75% extinguished. Then a firefighter picks up the nozzle and moves the foam stream back and forth until 90% extinguishment (control time) is obtained, at which time the firefighter is allowed to fight the fire from two sides of the pan. Times are recorded at 90% control and at extinguishment. Foam application is continued for a total of 5.0 minutes.

At about 14 minutes, a 1.0 square foot steel stovepipe is placed 1.0 ft from each side of the corner last extinguished and all foam inside the pipe is removed. After waiting 15 minutes from foam shut-off, the fuel inside the pipe is lit and allowed to burn for 1 minute. The pipe is then removed and timing of the burnback is started. When the fire increases to 20% of the pan area, the burnback time is recorded.

Foam quality is measured by taking the expansion ratio and drain time from the nozzle after running the fire test.

A FP product passes this fire test by extinguishing before 5.0 minutes and having a burnback equal to or greater than 5 minutes. Stronger products give shorter extinguishing and longer burnback times. It should be noted that FPs when compared with AFFF agents are applied at a rate of 0.06 vs 0.04 gal/$ft^2$ and for two minutes longer than AFFF agents; a longer burnback of 21 minutes minimum is required for FPs versus 15 minutes for AFFF agents.

Simple 3% synthetic surfactant concentrates were formulated to demonstrate the invention; Examples A–H are given below in Table 1 to show performance enhancement due to HS-100/Magnesium sulfate interactions.

The Chemguard HS-100 used as the anionic hydrocarbon surfactant is that manufactured by Chemguard Inc. at 45% solids in water. Chembetaine CAS is used at a 50% solids cocoamidopropyl hydroxypropyl sulfobetane, and is available from Chemron. Mackam 2CYSF is 50% solids octyl dipropionate from McIntyre while Deriphat D-160C is 30% solids lauryl dipropionate from Henkel. Sulfochem NADS is 30% solids sodium decyl sulfate in water from Chemron. Sulfochem NOS is 40% solids sodium n-octyl sulfate in water from Chemron. Witcolate 7103 is 60% solids ammonium lauryl ether sulfate from Witco. Magnesium sulfate is charged as the heptahydrate.

TABLE 1a

| | Components | | | | | | | |
|---|---|---|---|---|---|---|---|---|
| | A | B | C | D | E | F | G | H |
| (as 100%) | | | | | | | | |
| High MW Acidic Polymer (HMWAP) HS-100 | 0 | 0.9 | 1.8 | 2.7 | 3.6 | 3.6 | 3.6 | 3.6 |
| Chembetaine CAS | 0.5 | 0.5 | 0.5 | 0.5 | 0.5 | 0.5 | 0.5 | 0.5 |
| Sulfochem NADS | 6.0 | 6.0 | 6.0 | 6.0 | 6.0 | 6.0 | 6.0 | 6.0 |
| Hexylene Glycol | 2.0 | 2.0 | 2.0 | 2.0 | 2.0 | 2.0 | 2.0 | 2.0 |
| Magnesium Sulfate | 30.0 | 30.0 | 30.0 | 30.0 | 30.0 | 20.0 | 10.0 | 5.0 |
| Water | 61.5 | 60.6 | 59.7 | 58.8 | 57.9 | 67.9 | 77.9 | 82.9 |
| 3% Tap water solu. | | | | | | | | |
| Surface Tension[1] $\gamma_b$ | 22.5 | 23.3 | 24.4 | 23.9 | 24.0 | 23.9 | 23.0 | 24.7 |
| Interfacial Tension[1] $\gamma_I$ | 2.9 | 3.3 | 2.3 | 2.3 | 2.6 | 2.3 | 2.4 | 3.3 |
| Spreading Coeffic.[1,2] $SC_{a/b}$ | −0.7 | −1.9 | −2.0 | −1.5 | −1.9 | −1.5 | −0.7 | −3.3 |

[1]units – dynes/cm, with interfacial tension against cyclohexane
[2]$\gamma_a$ = 24.7 dynes/cm TABLE 1b

| | Components | | | | | | | |
|---|---|---|---|---|---|---|---|---|
| (as 100%) | I | J | K | L | M | N | O | P |
| High MW Acidic Polymer (HMWAP) HS-100 | 3.6 | 0 | 3.6 | 3.6 | 3.6 | 4.1 | 4.1 | 3.6 |
| Chembetaine CAS | 0 | 0 | 0 | 0 | 0 | 0.5 | 0.5 | 0 |
| Mackam 2CYSF | 1.5 | 1.5 | 1.5 | 2.8 | 5.0 | 0 | 0 | 0 |
| Deriphat D-160C | 0 | 0 | 0 | 0 | 0 | 0 | 0 | 4.8 |
| Sulfochem NOS | 0 | 0 | 0 | 0 | 0 | 0 | 0 | 2.0 |
| Sulfochem NADS | 9.0 | 9.0 | 6.0 | 6.0 | 6.0 | 7.5 | 0 | 0 |
| Witcolate 7103 | 0 | 0 | 0 | 0 | 0 | 0 | 7.5 | 0 |
| Hexylene Glycol | 2.0 | 2.0 | 2.0 | 2.0 | 2.0 | 2.0 | 2.0 | 2.0 |
| Magnesium Sulfate | 30.0 | 30.0 | 30.0 | 30.0 | 30.0 | 30.0 | 30.0 | 30.0 |
| Water | 53.9 | 57.5 | 56.9 | 55.6 | 53.4 | 54.0 | 54.0 | 59.6 |

TABLE 1c

| | Components | | | | | |
|---|---|---|---|---|---|---|
| (as 100%) | Q | R | S | T | U | V |
| High MW Acidic Polymer (HMWAP) HS-100 | 2.3 | 1.4 | 0 | 2.5 | 4.1 | 4.1 |
| Chembetaine CAS | 0 | 0 | 0 | 0 | 0 | 0 |
| Mackam 2CYSF | 1.7 | 1.7 | 1.7 | 1.7 | 1.3 | 2.3 |
| Sulfochem NADS | 10.5 | 10.5 | 10.5 | 10.5 | 6.0 | 9.0 |
| Witcolate 7103 | 0 | 0 | 0 | 0 | 0 | 0 |
| Hexylene Glycol | 0 | 0 | 0 | 2.0 | 2.0 | 0 |
| Magnesium Sulfate | 30.0 | 30.0 | 30.0 | 30.0 | 25.0 | 15.0 |
| Water | 55.5 | 56.4 | 57.8 | 46.0 | 61.6 | 69.6 |

TABLE 2a

UL 162 Type III, Class B, Heptane Fire Tests, 3% Tap, 5 min @ 0.06 gal/ft$^2$

| | 3% Agents | | | | | | | |
|---|---|---|---|---|---|---|---|---|
| | A | B | C | D | E | F | G | H |
| HS-100 (%) | 0 | 0.9 | 1.8 | 2.7 | 3.6 | 3.6 | 3.6 | 3.6 |
| Magnesium Sulfate (%) | 30.0 | 30.0 | 30.0 | 30.0 | 30.0 | 20.0 | 10.0 | 5.0 |
| Heptane, ° F. | 63 | 64 | 73 | 68 | 68 | 72 | 55 | 68 |
| Water, ° F. | 59 | 64 | 81 | 79 | 77 | 82 | 59 | 77 |
| Control Time* | None | 1.8 | 1.5 | 1.2 | 1.0 | 1.0 | 1.0 | 1.5 |
| Extinguish. Time* | 60% | 3.6 | 3.1 | 2.5 | 1.9 | 2.2 | 2.2 | 3.0 |
| Foam Cover at BB | N/A | 50% | 95% | 100% | 100% | 100% | 95% | 2% |
| Burnback Time* | N/R | N/R | −0.1 | 0.8 | 4.1 | 2.8 | 0.7 | N/R |
| Foam Exp. | 5.8 | 6.1 | 7.8 | 7.6 | 8.0 | 6.3 | 6.1 | 6.2 |
| Foam ¼ Drain* | 2.0 | 2.3 | 2.7 | 2.8 | 3.0 | 3.6 | 3.5 | 2.6 |

*Time in minutes

TABLE 2b

UL 162 Type III, Class B, Heptane Fire Tests, 3% Tap, 5 min @ 0.06 gal/ft$^2$

| | 3% Agents | | | | | | | |
|---|---|---|---|---|---|---|---|---|
| | I | J | K | L | M | N | 0 | P |
| Heptane, ° F. | 63 | 61 | 68 | 55 | 63 | 66 | 68 | 63 |
| Water, ° F. | 70 | 68 | 73 | 55 | 66 | 72 | 68 | 75 |
| Control Time* | 1.0 | None | 0.9 | 1.3 | 0.9 | 0.8 | 0.9 | 1.0 |
| Extinguish. Time* | 2.1 | None | 2.5 | 2.0 | 2.2 | 1.7 | 1.5 | 2.3 |
| Foam Cover at BB | 100% | N/A | 100% | 100% | 100% | 100% | 100% | 100% |
| Burnback Time* | 4.3 | N/R | 4.6 | 5.5 | 4.8 | 4.7 | 4.5 | 3.7 |
| Foam Exp. | 7.0 | 6.9 | 6.5 | 6.5 | 6.8 | 7.5 | 6.3 | 6.3 |
| Foam ¼ Drain* | 4.1 | 1.9 | 4.1 | 3.6 | 4.4 | 3.3 | 3.0 | 3.5 |

*Time in minutes

TABLE 2c

UL 162 Type III, Class B, Heptane Fire Tests, 3%, 3 min @ 0.04 gal/ft$^2$

| | 3% Agents | | | | | | |
|---|---|---|---|---|---|---|---|
| | Q | R | S | T | U | U | V |
| Water | Tap | Tap | Tap | Tap | Tap | Sea Water | Sea Water |
| Heptane, ° F. | 61 | 57 | 59 | 63 | 55 | 50 | 57 |
| Water, ° F. | 70 | 63 | 55 | 63 | 64 | 50 | 57 |
| Control Time* | 1.1 | 1.6 | None | 0.8 | 1.0 | 1.2 | 0.8 |
| Extinguish. Time* | 2.0 | 2.5 | None | 1.8 | 1.8 | 2.3 | 1.8 |
| Foam Cover at BB | 100% | 100% | N/A | 100% | 100% | 100% | 100% |
| Burnback Time* | >7.0 | 1.9 | 0 | >10.0 | >8.0 | 6.8 | >8.0 |
| Foam Exp. | 8.4 | 7.3 | 6.5 | 8.3 | 8.6 | 7.6 | 6.5 |
| Foam ¼ Drain* | 4.7 | 3.7 | 3.1 | 5.8 | 6.5 | 3.8 | 3.6 |

*Time in minutes

Examples A–E

Examples A through E (Tables 1a and 2a) demonstrate a definitive improvement in UL162 type performance when the HS-100 content is increased from 0 to 3.6% while holding the magnesium sulfate content constant at 30%; all other formula components are held constant. In fact, Example A without HS-100 did not control the fire (60% extinguishment at 5.0 minutes) while Example E extinguished at a rapid 1.9 minutes, had 100% foam cover at burnback time, and had 4.1 minutes burnback; a vast improvement on increasing HS-100 concentration. Clearly, the performance improved with each increase in the HS-100 content going from Example A through E when the magnesium sulfate content was held at 30%. Since all other components were held constant, the UL 162 type performance improvement must be due to the HS-100; a high molecular weight anionic polymer.

From Examples A–E, it can be seen that there is no correlation between the spreading coefficient (SC) and the fire performance of the formulations. Example A with the least negative SC had the poorest performance, while Example E had a negative 1.9 SC and performed best in the series. It can be reasoned that the fire performance is independent of the SC. Therefore, the interaction between the HMWAP and polyvalent salt must stabilize the foam bubble to the flame and hot fuel rather than enhance the surface active properties.

Examples E–H and I, J

Examples E through H (Tables 1a and 2a) show a dramatic reduction in performance as the magnesium sulfate content was reduced from 30% to 5% in increments while holding the HS-100 content at 3.6%. In fact, Example H with only 5% magnesium sulfate and 3.6% HS-100 (a high level) would extinguish the fire, but at burnback time only 2% of the pan was covered with foam. Therefore a burnback could not be run. Certainly, UL 162 fire performance decreased with each reduction in the magnesium sulfate content.

The SCs of Examples F–H, as above, did not correlate with the fire performance of the formulations. It must again be concluded that the surface active properties do not control the fire performance characteristics of the working invention.

Examples I and J illustrate two formulas utilizing Mackam 2CYSF instead of Chembetaine CAS, where Example I contains 3.6% HS-100/30% magnesium sulfate and J has 0% HS-100/30% magnesium sulfate. As in the examples above (E&A), even with a high magnesium sulfate content Example J without HS-100 would not even extinguish the fire while Example I performed well. Clearly, strong UL162 fire performance requires that both HS-100 and magnesium sulfate be at effective levels.

However, various combinations of HS-100 and magnesium sulfate were seen to provide enhanced fire performance. Example G with 3.6% HS-100/10% magnesium sulfate demonstrated approximately equivalent performance to previously presented Example D with 2.7% HS-100/30% magnesium sulfate. Therefore, excellent performance is obtained from lower HS-100 content formulations if higher quantities of magnesium sulfate are used.

It should be noted that even at 3.6% HS-100/5% magnesium sulfate and 0.9% HS-100/30% magnesium sulfate, the fires were extinguished at 3.0 and 3.6 minutes; demonstrating the effectiveness of larger quantities of HS-100 in the presence of low levels of magnesium sulfate or visa versa. Higher quantities of either HS-100 or magnesium sulfate are required for obtaining acceptable burnback performance.

Examples K–M (Tables 1b and 2b)

Example K is varied from Example E by only replacing Chembetaine CAS with Mackam 2CYSF at a higher actives level. It can be seen that Mackam 2CYSF works well as a replacement for Chembetaine CAS since both formulations had excellent extinguishment and burnback performance. Examples K–M demonstrate the effect of further increasing levels of amphoteric hydrocarbon surfactant on UL 162 fire performance. Examples K–M represent a series with increasing levels of Mackam 2CYSF amphoteric surfactant. The best performance overall was obtained by Example L with 2.8% Mackam 2CYSF. It should be noted that Example L passed all specifications for the UL 162 fire test including the burnback which requires a minimum of 5 minutes for the burnback.

Examples N–P (Tables 1b and 2b)

Examples N and O compare formulas having different anionic hydrocarbon surfactants at the same actives content. It can be seen that 7.5% actives Sulfochem NADS (sodium decyl sulfate, Example N) and Witcolate 7103 (ammonium dodecyl or lauryl ether sulfate, Example O) provide equivalent fire performance. Therefore, sodium decyl sulfate and ammonium dodecyl ether sulfate work to provide similar performance in these formulations.

Example P exemplifies a very different hydrocarbon surfactant mixture with 4.8% actives Deriphat 160C, a sodium lauryl sulfate amphoteric, and 2.0% actives Sulfochem NOS, sodium octyl sulfate. Although extinguishment was somewhat slower and burnback was shorter than for Examples N&O, good performance was still obtained for such a large change in the base formula when the HS-100 and magnesium sulfate contents were 3.6% and 30%, respectively.

Examples Q–S (Tables 1c and 2c)

Examples A–P refer to UL fire tests based on the Fluoroprotein (FP) fire test procedure with foam applied at 3 gpm (0.06 gal/ft$^2$) for 5 minutes. Examples Q–U were tested using the AFFF test regime of 2 gpm (0.04 gal/ft$^2$) for 3 minutes; a tougher test procedure since only 6 gallons of premix is used versus 15 gallons for the FP test. Examples Q–S exemplify the importance of HS-100 and magnesium sulfate for obtaining AFFF type UL 162 fire performance. As HS-100 is reduced from 2.3% (Ex. Q), to 1.4% (Ex. R) and finally 0% HS-100 (Ex. S), the performance went from excellent, to moderate, to poor. Example Q, however, was a strong product meeting all UL 162 fire performance requirements. Even at 39% less HS-100 content, Example R extinguished the fire at 2.5 minutes and gave 1.9 minutes of burnback time. Only at 0% HS-100 did fire performance properties disappear.

It should be further noted that for Examples Q–S, no solvent was included in the formulation to enhance or stabilize foam, yet excellent foam quality was produced. Therefore, it is clear that these formulations do not require the addition of solvent foam boosters.

Examples T–V (Tables 1c and 2c)

Examples T&U are similar to Example Q, but have the addition of a solvent foam stabilizer, hexylene glycol, and have varied levels of Mackam 2CYSF and Sulfochem NADS. Examples T&U can be seen in Table 2c to provide exceptional extinguishment at only 1.8 minutes and burnback times greater than 8.0 minutes with tap water. Example U when tested with sea water gave an extinguishment of 2.3 minutes and 6.8 minutes for burnback; still excellent performance.

Example V demonstrates excellent performance in sea water without the use of a foam stabilizer and with only 15% magnesium sulfate. Extinguishment was less than 2 minutes and burnback time was greater than 8.0 minutes.

These examples demonstrate that the combination of a HMWAP and a polyvalent salt provides UL 162 Class B fire performance using either the AFFF or FP standard conditions.

The UL162 Type III, Class B fire test recognizes a difference between AFFF and FP type fire extinguishing agents. AFFF agents must extinguish in 3.0 minutes or less at an application density of only 0.04 gal/ft$^2$, while FP agents only need to extinguish in 5.0 minutes at an application density of 0.06 gal/ft$^2$. This means 6.0 gallons of premix are used for AFFF while 15.0 gallons of premix are applied for FP agents. As noted above, however, the burnback requirements for FP agents are more severe than for AFFF agents. FP agents must have a minimum of 21 minutes burnback from time of foam shutoff compared to 15 minutes minimum burnback for AFFF agents.

The fire fighting compositions, as described herein, may be applied to non-polar liquid hydrocarbons to extinguish or retard fires from such liquids during burning. The composition may be applied both to the surface of such liquids or may be introduced below the surface, such as through injection. The composition may be applied in combination with other fire fighting agents, if necessary, such as the dual-agent application of both foam and a dry chemical or powder fire fighting agents. An example of such a dry chemical or powder agent is that available commercially as Purple K. In such dual application, the fire fighting agents may be applied through the use of adjacent or as generally concentric nozzles. In some instances, the dry or powder agent may be applied alone to initially extinguish any flame, with the foam being applied to prevent reigniting of the fuel.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A method of extinguishing or retarding a fire comprising:

providing a fire fighting composition comprising water, a high molecular weight acidic polymer (HMWAP) having an average molecular weight of at least 5000 g/mol, a hydrocarbon surfactant and a coordinating salt, the fire fighting composition meeting UL 162, Class B performance criteria for at least one of AFFF agents and fluoroprotein (FP) agents without requiring organic fluorine and that does not form a stable seal on cyclohexane; and applying the composition to an area where extinguishment or retardation of the fire is desired.

2. The method of claim 1, further comprising:

applying the composition to the area in combination with a dry fire fighting agent.

3. The method of claim 1, wherein:

the fire fighting composition meets UL 162, Class B performance criteria for both AFFF agents and fluoroprotein (FP) agents without requiring organic fluorine.

4. The method of claim 1, wherein:

the fire fighting composition has from about 0.01 to about 0.3% HMWAP by weight of the fire fighting composition.

5. The method of claim 1, wherein:

the fire fighting composition has from about 0.1 to about 1.5% of the coordinating salt by weight of the fire fighting composition.

6. The method of claim 1, wherein:

the fire fighting composition contains a fluorochemical surfactant that provides less than about 0.006% fluorine by weight of the fire fighting composition.

7. The method of claim 1, wherein:

the fire fighting composition has a spreading coefficient against cyclohexane of zero or less.

8. The method of claim 1, wherein:

the fire fighting composition has from about 0.01 to about 0.3% HMWAP by weight of the fire fighting composition, and wherein the fire fighting composition has from about 0.10 to about 1.5% of the coordinating salt by weight of the fire fighting composition.

9. The method of claim 1, wherein:

the coordinating salt includes those selected from salts and electrolytes of aluminum, antimony, barium, boron, calcium, copper, iron, magnesium, calcium, strontium and zinc.

10. The method of claim 1, wherein:

the HMWAP includes those polymers having C4 to C22 alkyl branching.

11. The method of claim 1, wherein:

the fire fighting composition includes at least one of a fluorochemical surfactant, an amphoteric hydrocarbon surfactant, an anionic surfactant, a nonionic surfactant, a foaming aid, a freeze protection agent, a sequestering agent, a buffering agent, a corrosion inhibitor, a polymeric film former, an antimicrobial agent, a preservative, a polymeric foam stabilizer and a polymeric foam thickener.

12. The method of claim 1, wherein:

the coordinating salt is a polyvalent salt.

13. A method of extinguishing or retarding a fire comprising:

providing a foam concentrate comprising water, a high molecular weight acidic polymer (HMWAP) having an average molecular weight of at least 5000 g/mol, a hydrocarbon surfactant and a coordinating salt;

mixing the foam concentrate with water to form a fire fighting composition meeting UL 162, Class B performance criteria for at least one of AFFF agents and fluoroprotein (FP) agents without requiring organic fluorine and that does not form a stable seal on cyclohexane; and applying the composition to an area where extinguishment or retardation of the fire is desired.

14. The method of claim 13, wherein:

the foam concentrate has a HMWAP content that provides the fire fighting composition with from about 0.01 to about 0.3% HMWAP by weight of the fire fighting composition.

15. The method of claim 13, wherein:

the foam concentrate has a coordinating salt content that provides the fire fighting composition with from about 0.1 to about 1.5% of the coordinating salt by weight of the fire fighting composition.

16. The method of claim 13, wherein:

the foam concentrate includes a fluorochemical surfactant, and wherein the foam concentrate has a fluorine content provided from the fluorochemical that provides the fire fighting composition with less than about 0.006% fluorine by weight of the fire fighting composition.

17. The method of claim 13, wherein:

the foam concentrate is used in an amount of from about 1 to about 10 parts concentrate to about 90 to about 99 parts water to form the fire fighting composition.

18. The method of claim 13, wherein:

the foam concentrate includes at least one of a fluorochemical surfactant, an amphoteric hydrocarbon surfactant, an anionic surfactant, a nonionic surfactant, a foaming aid, a freeze protection agent, a sequestering agent, a buffering agent, a corrosion inhibitor, a polymeric film former, an antimicrobial agent, a preservative, a polymeric foam stabilizer and a polymeric foam thickener.

19. The method of claim 13, wherein:

the fire fighting composition meets UL 162, Class B performance criteria for both AFFF agents and fluoroprotein (FP) agents without requiring organic fluorine.

20. The method of claim 13, wherein:

the fire fighting composition has a spreading coefficient against cyclohexane of zero or less.

21. The method of claim 13, wherein:

the fire fighting composition has from about 0.01 to about 0.3% HMWAP by weight of the fire fighting composition, and wherein the fire fighting composition has from about 0.10 to about 1.5% of the coordinating salt by weight of the fire fighting composition.

22. The method of claim 13, wherein:

the coordinating salt includes those selected from salts and electrolytes of aluminum, antimony, barium, boron, calcium, copper, iron, magnesium, calcium, strontium and zinc.

23. The method of claim 13, wherein:

the HMWAP includes those polymers having C4 to C22 alkyl branching.

24. The method of claim 13, wherein:

the coordinating salt is a polyvalent salt.

25. A method of extinguishing or retarding a fire comprising:

providing a fire fighting composition comprising water, a high molecular weight acidic polymer (HMWAP) having an average molecular weight of at least 5000 g/mol, a hydrocarbon surfactant and a polyvalent coordinating salt, the fire fighting composition meeting UL 162, Class B performance criteria for both AFFF agents and fluoroprotein (FP) agents without requiring organic fluorine and that does not form a stable seal on cyclohexane; and applying the composition to an area where extinguishment or retardation of the fire is desired.

* * * * *